US007143508B2

(12) United States Patent
Schnell et al.

(10) Patent No.: US 7,143,508 B2
(45) Date of Patent: Dec. 5, 2006

(54) NAIL SPACING VERIFICATION ASSEMBLY

(75) Inventors: John W. Schnell, Jackson, TN (US); John M. Beville, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 301 days.

(21) Appl. No.: 10/665,094

(22) Filed: Sep. 17, 2003

(65) Prior Publication Data

US 2006/0102684 A1 May 18, 2006

Related U.S. Application Data

(60) Provisional application No. 60/411,563, filed on Sep. 18, 2002, provisional application No. 60/471,641, filed on May 19, 2003.

(51) Int. Cl.
*B23P 21/00* (2006.01)
*B23Q 7/10* (2006.01)
*B25C 5/06* (2006.01)

(52) U.S. Cl. ......................... 29/709; 29/812.5; 29/705; 227/119

(58) Field of Classification Search ............. 29/407.09, 29/407.05, 407.01, 705, 706, 707, 709, 812.5, 29/402.79; 227/119, 120, 130, 148; 221/238, 221/279

See application file for complete search history.

(56) References Cited

U.S. PATENT DOCUMENTS

| | | | | |
|---|---|---|---|---|
| 4,949,780 | A | 8/1990 | Chen | 165/7 |
| D323,835 | S | 2/1992 | Leu | D15/133 |
| 5,241,888 | A | 9/1993 | Chen | 83/471.3 |
| D351,605 | S | 10/1994 | Chen | D15/138 |
| D368,701 | S | 4/1996 | Foy | D14/100 |
| D386,192 | S | 11/1997 | Chen | D15/132 |
| 5,694,714 | A | 12/1997 | Basso et al. | 43/26.2 |
| D389,494 | S | 1/1998 | Chen | D15/133 |
| D391,585 | S | 3/1998 | Chen | D15/133 |
| D393,648 | S | 4/1998 | Chen | D15/132 |
| 5,778,747 | A | 7/1998 | Chen | 83/471.3 |
| 5,778,752 | A | 7/1998 | Chen | 83/783 |
| D397,343 | S | 8/1998 | Chen | D15/133 |
| 5,836,501 | A | 11/1998 | Lai | 227/8 |
| 5,881,941 | A | 3/1999 | Lai | 227/130 |
| 5,924,621 | A | 7/1999 | Hung | 227/130 |
| 5,934,539 | A | 8/1999 | Lee | 227/109 |
| 6,024,268 | A | 2/2000 | Horng-Lin | 227/120 |
| 6,024,269 | A | 2/2000 | Ho et al. | 227/130 |
| 6,059,166 | A | 5/2000 | Ho et al. | 227/130 |
| 6,059,167 | A | 5/2000 | Ho et al. | 227/130 |
| 6,089,436 | A | 7/2000 | Ho et al. | 227/130 |
| 6,149,046 | A | 11/2000 | Ho et al. | 227/8 |

(Continued)

FOREIGN PATENT DOCUMENTS

BE EP 1122195 * 8/2001

*Primary Examiner*—John C Hong
(74) *Attorney, Agent, or Firm*—Scott B. Markow

(57) ABSTRACT

A nail spacing verification assembly is provided which enables the spacing between nails contained in a collated nail strip, the collated nail strip advancing down a nail loading assembly of a nail gun, to be verified before the nail is allowed to advance. A first and second probe are operationally coupled with each other. If nail spacing is correct, the first probe engages the second probe causing both probes to rotate and the nail to pass. If spacing is incorrect, the first probe does not engage the second probe and the nail is hindered from advancing down a nail loading assembly.

56 Claims, 5 Drawing Sheets

U.S. PATENT DOCUMENTS

| | | | | |
|---|---|---|---|---|
| 6,170,729 | B1 | 1/2001 | Lin | 227/8 |
| 6,170,730 | B1 | 1/2001 | Lin | 227/119 |
| 6,173,963 | B1 | 1/2001 | Ho et al. | 277/361 |
| D442,190 | S | 5/2001 | Chen | D15/133 |
| 6,264,085 | B1 | 7/2001 | Ho et al. | 227/8 |
| 6,290,115 | B1 | 9/2001 | Chen | 227/120 |
| 6,296,168 | B1 | 10/2001 | Hung | 227/130 |
| D453,345 | S | 2/2002 | Chen | D15/133 |
| 6,392,381 | B1 | 5/2002 | Chen | 320/111 |
| 6,397,954 | B1 | 6/2002 | Liu | 173/93.5 |
| 6,431,428 | B1 | 8/2002 | Chen | 227/120 |

* cited by examiner

NAIL SPACING VERIFICATION ASSEMBLY

CROSS REFERENCE TO RELATED APPLICATION

The present application claims priority under 35 U.S.C. §119(e) to the U.S. Provisional Application Ser. No. 60/411,563, filed on Sep. 18, 2002, and the U.S. Provisional Application Ser. No. 60/471,641, filed on May 19, 2003. The U.S. Provisional Applications 60/411,563 and 60/471,641 are herein incorporated by reference in their entireties.

FIELD OF THE INVENTION

The present invention generally relates to the field of power tools, and particularly to a nail spacing verification assembly for use in a power tool, such as a nail gun.

BACKGROUND OF THE INVENTION

The use of nail guns, such as pneumatic nail guns, is commonplace in the construction industry. Devices, such as the nails employed with nail guns are often provided in collated packets. Typically, pneumatic nail guns employ round-head nails or clipped-head nails in collated strips. The collated strip of nails set each nail at a specific angle relative to each other. The particular angle of collation varies depending on the type of nail being employed and enables functionality with the pneumatic nail gun within which the nails are used. Thus, it is often the case that particular collated nail strips are limited in their application to particular nail guns.

The collated nail strips are loaded into the nail gun through a nail loading assembly, often identified as the nail gun magazine. The nail gun magazine provides storage capabilities for the nails as well as the ability to present the nails to a nail driving assembly. The nail driving assembly of a pneumatic nail gun uses air pressure to drive a driver blade through a channel disposed within a nose casting, the nose casting being coupled with the nail gun magazine and is where an individual nail is presented.

The inside of the nail gun magazine typically includes a mechanism for providing a driving force to the collated nails. The driving force pushes the collated nails down the length of the nail gun magazine to the nose casting. The driving force keeps a constant pressure on the collated nails so that as one nail is driven by the driver blade the next nail is forced into the nose casting to replace it. The mechanism for driving the nails in the nail gun magazine is commonly fixed to provide the proper force only to nails of the proper collation angle. Thus, if improperly collated nails are loaded into the nail gun magazine, the driving force mechanism improperly engages the nails and results in a misfire. A misfire may result in damage to the nail gun and/or operator as well as a decrease in production and efficiency. Therefore, when operating a nail gun it is crucial to load the correct collated nail strip.

Typically, nail guns do not contain a mechanism for verifying the angle of the collated nails loaded into it. Further, in general, a device is not included within the magazine to block the loading of the nails from the magazine into the nose casting if the angle of collation of the nails provides nails at the improper angle. Thus, the primary method of preventing improper nail use is operator awareness. As such, the operator is required to be constantly aware of the type of collated nail strips being used. Due to the time being spent ensuring proper nail use, workplace productivity and efficiency may be decreased. Therefore, it would be desirable to design a nail gun which included a system which may increase the likelihood that the collated nail strip being loaded into the gun is the correct type for that particular nail gun.

SUMMARY OF THE INVENTION

Accordingly, the present invention is directed to a nail spacing verification assembly. The nail spacing verification assembly determines if the correct collated nail strip has been loaded into the nail loading assembly of a nail gun, such as a pneumatic nail gun. The determination is based on the angle the nail loading assembly is coupled with a nose casting assembly of the nail gun. Thus, an operator of the nail gun with the present invention incorporated is provided assistance in maintaining the proper functioning of the nail gun.

The nail spacing verification assembly may result in several benefits, examples of which follow. First, the instances of nail misfire may be reduced. Second, instances of damage to the nail gun and nail strip caused by improper nail use may be significantly reduced. Third, efficiency and productivity in the workplace may be increased.

A first aspect of the present invention includes a nail spacing verification assembly comprised of a first and second probe for use in a nail loading assembly of a nail gun. The two probes are operationally linked to each other and able to rotate. As nails in a collated nail strip advance down the nail track of a nail loading assembly, the nail encounters the first probe which determines if nail spacing is correct. If nail spacing is correct, the first probe engages the second probe causing both probes to rotate. If no spacing exists between the nails, the first probe does not engage the second probe, but, instead, both the first and second probe lock into place hindering the nail from further advancing down the nail loading assembly. When the spacing of the nails in the collated nail strip is determined to be correct both probes rotate and the nails are allowed to advance down the nail loading assembly.

In a second aspect of the present invention, a nail spacing verification assembly comprising a first spring loaded probe and a second probe, for use in a nail loading assembly of a nail gun is provided. The two probes are operationally linked to each other. The first probe contains a spring assembly which enables a first armature to retract and extend within a first sleeve. As nails in a collated nail strip advance down a nail loading assembly, the nail encounters the first probe, causing the first probe to retract, which determines if nail spacing is correct. If the spacing between the nails is correct, the spring loaded section of the first probe may stay retracted, the second probe is engaged and rotates allowing the nail to pass. If spacing exists between the nails, the first probe extends, the second probe is neither engaged nor rotated and the nails are, thusly, hindered from advancing.

In a third aspect of the present invention, an adjustable angle magazine is provided which adjustably couples to a nail driving assembly of a nail gun. The adjustable angle magazine comprises a housing including a first end and a second end, the housing stores a nail and provides nails in a collated nail strip to the nail driving assembly. An adjustment assembly is disposed proximal to the second end of the housing, the adjustment assembly for affixing the position of the housing relative to the nail gun. A universal adapter assembly is coupled to a first end of the adjustable angle magazine and enables the pivoting coupling of the adjustable angle magazine with the nail driving assembly. A nail spacing verification assembly is disposed upon the housing for engaging the nails and allowing the nails to advance when the nail spacing assembly determines that the spacing between the nails in the collated nail strip is correct.

In a fourth aspect of the present invention, an adjustable angle nail gun is provided. The adjustable angle nail gun comprises a handle with a first end and a second end coupled with a fastening assembly. A nail driving assembly including a driver blade is coupled with the first end of the handle and is for driving nails in a collated nail strip. An adjustable angle nose casting assembly is coupled with the nail driving assembly. The adjustable angle nose casting assembly enables the operational engagement of the driver blade with the nail. An adjustable angle magazine for storing and providing the nails is pivotally coupled with the adjustable angle nose casting assembly. A universal adapter assembly is coupled with a first end of the adjustable angle magazine and enables the pivotal coupling of the adjustable angle magazine with the adjustable angle nose casting assembly. An adjustment assembly disposed proximal to the second end of the adjustable angle magazine couples with the fastening assembly. A nail spacing verification assembly is disposed upon the housing for engaging the nails and allowing the nails to advance when the nail spacing assembly determines that the spacing between the nails in the collated nail strip is correct.

In a fifth aspect of the present invention, a method for determining whether a proper collated nail strip has been loaded into a nail loading assembly for driving by a nail driving assembly of a nail gun. An operator of a nail gun selects and loads the collated nail strip into the nail loading assembly. As the nail strip advances through the nail loading assembly the nails are engaged by a nail spacing verification assembly. The nail spacing verification assembly determines whether the collated nail strip provides nails in the correct position for use by the nail gun. If the nails are correctly positioned then they are allowed to advance and be received into the nail driving assembly. If the nails are incorrectly positioned then they are not allowed to advance and are locked in place within the nail loading assembly.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference may now be made in detail to the presently preferred embodiments of the invention, examples of which are illustrated in the accompanying drawings.

Figure 1:
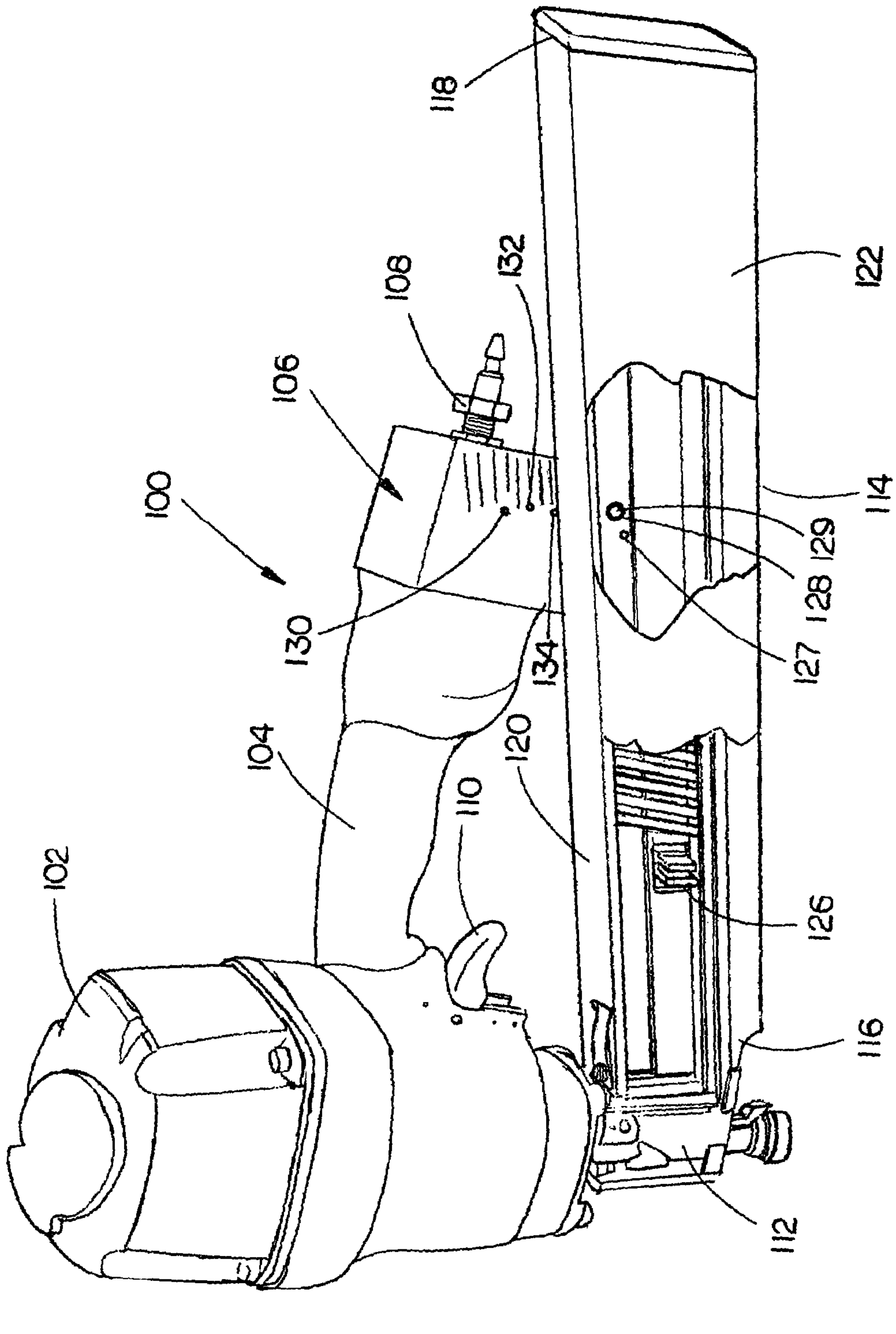
FIG. 1 is an illustration of an adjustable angle nail gun including an adjustable angle magazine employing a nail spacing verification assembly in accordance with an exemplary embodiment of the present invention.

Referring generally now to FIGS. 1 through 4, exemplary embodiments of the present invention are shown. In FIG. 1, an adjustable angle nail gun 100 is shown. The adjustable nail gun 100 includes a casing 102 coupled with a handle 104. The handle 104 is coupled with a fastening assembly 106 and an air compressor adapter assembly 108. It is understood that the air compressor adapter assembly 108 may be coupled through the fastening assembly 106 to the handle 104. Arranged within the casing 102 is a nail driving assembly including a driver blade. The nail driving assembly is actuated by a trigger 110. Coupled to the casing 102 and operationally engaging with the driver blade of the nail driving assembly is an adjustable angle nose casting assembly 112. An adjustable angle nail loading assembly 114 includes a first end 116 and a second end 118. The first end 116 pivotally couples with the adjustable angle nose casting assembly 112. The adjustable angle nail loading assembly 114 adjustably couples with the fastening assembly 106 via an adjustment assembly (described below) disposed proximal to the second end 118.

Preferably, the adjustable angle nail loading assembly 114 is an adjustable angle magazine further comprising a nail housing 120 coupled with a cover 122. Arranged within the nail housing 120 is a nail spacing verification assembly 126. It is understood that the cover 122 may engage with the nail housing 120 via a variety of mechanisms, such as a sliding mechanism, compression mechanism, or the like. The size of the nail housing 120 and the cover 122 may vary to accommodate various nail configurations. In the present embodiment, the adjustable angle magazine 114 loads nails into the nail housing 120 from the second end 118. Thus, it is understood that the pusher assembly is movably disposed within the nail housing 120 and removable from the nail housing 120 allowing for loading and unloading of nails.

The adjustable angle magazine 114 provides the operator of a nail gun the ability to use a variety of nail types collated at a variety of angles within the same nail gun. The housing 120 is configured generally to appear as a standard nail gun magazine with the cover 122 slidably coupled with it. The housing 120 may be configured for operation without the cover 122. In alternative embodiments, the housing 120 may be coil-type casing where the connected nails are arranged in a long belt, which winds around a spool. The coil-type casing may be configured in a variety of ways, such as a horizontal coil-type casing or a vertical coil-type casing. The cover 122 may be configured to operate with alternative embodiments, such as the coil-type casing, or may not be included. It is understood that alternative design embodiments of the housing 120 and cover 122 may be employed and do not depart from the scope and spirit of the present invention.

The fastening assembly 106 includes a plurality of angular adjustment sites, as exemplified by a first angular adjustment site 130, a second angular adjustment site 132 and a third angular adjustment site 134. The fastening assembly 106 is disposed with a plurality of angle identifiers. The angle identifiers are a series of indicators associated with a printed number (i.e., 30, 29, 28, 27 . . . ) which corresponds to the angle of presentation of the adjustable angle magazine 114 to the adjustable angle nose casting assembly 112. It is contemplated that the angle identifiers may be a label with the numbers printed upon them which may be adhered to the fastening assembly 106. Alternatively, the numbers may be engraved or painted upon the fastening assembly 106.

In the current embodiment, it is understood that the plurality of angular adjustment sites may be engaged by a fastener 129, such as a bolt, screw, pin, and the like. The fastener 129 engages through the housing 120 via an adjustment assembly comprising a first angular connection site 127 and a second angular connection site 128. Alternatively, the number of angular connection sites may vary as contemplated by one of ordinary skill. The fastener 129 engages through the first or second angular connection site and connects with one of the plurality of angular adjustment sites.

In an alternative embodiment, the fastening assembly employed by the present invention may be variously configured. For example, the fastening assembly may be implemented using a worm drive assembly. In such a configuration, a threaded shaft may be disposed within the fastening assembly and operationally coupled with a threaded sleeve. The threaded sleeve may be enabled to move up and down the threaded shaft through rotation of a mechanical rotation assembly, which couples with the threaded shaft, by an operator of the nail gun. A post coupled with the housing of the adjustable angle magazine may be further coupled to the threaded sleeve, thus enabling the angular adjustment of the adjustable angle magazine. Other configurations may include a pneumatic fastening system, hydraulic fastening system, alternative mechanical systems, and the like. For instance, the fastening assembly may utilize the compressed air provided through the compressor connection assembly by redirecting the flow of a portion of the compressed air into a gauge assembly. The gauge assembly may include a readout which provides a visual indication to the operator of the angle of the nail loading assembly relative to the adjustable angle nose casting assembly of the adjustable angle nail gun. Further, the gauge assembly may include an actuator which may allow the operator of the adjustable angle nail gun to alter the flow of the compressed air into the gauge assembly either increasing or decreasing the flow. Alternatively, the gauge assembly may provide a bleed-off valve assembly enabling the operator to regulate the release of the compressed air in the gauge assembly. Either by increasing and decreasing the air flow or bleeding-off the compressed air the operator may change the angle of the adjustable angle magazine relative to the adjustable angle nose casting assembly. The gauge assembly may control the angle of the adjustable angle magazine via a piston assembly engaging with the housing of the adjustable angle magazine. The piston assembly may include a piston engaging a shaft which is coupled with the housing, thus, as the shaft moves so to does the housing of the adjustable angle magazine. It is understood the piston moves the shaft by reacting to changing air pressures within.

In an alternative embodiment, a mechanical fastening system may include a ratchet assembly with a hand brake. The hand brake is engaged by the operator and through pressure applied to the hand brake the ratchet assembly raises or lowers the housing of the adjustable angle magazine. For example, the hand brake may include a spring loaded snap joint which provides incremental adjustments of the angle of the housing relative to the adjustable angle nose casting assembly. The spring loaded snap joint engages a multi-position actuator which engages the ratcheting assembly. The hand brake may be disposed on the handle of the nail gun assembly to provide easy access and control over the nail gun assembly during operation of the hand brake.

In an alternative embodiment, the adjustable angle nail gun may be a pneumatic nail gun. Further, the adjustable angle nail gun may be a spring-loaded nail gun assembly. The spring-loaded nail gun assembly utilizing electricity to drive a motor which may engage a spring that drives the driver blade. In another embodiment, the adjustable angle nail gun may be an electro-magnetic nail gun assembly utilizing a solenoid to provide the driving force to the driver blade. The solenoid may include an electromagnetic coil with a sliding piston inside it. Other embodiments of the solenoid may include a spring assembly to draw the piston back in. In a still further embodiment, the adjustable angle nail gun may be a combustion nail gun assembly utilizing a piston driven by the firing of gas in a combustion chamber to drive the driver blade. It is contemplated that the adjustable angle nail gun may be configured as a motor driven nail gun. Thus, the adjustable angle nail gun may be configured with electric motors and the like. Further, the motors may include clutch assemblies for providing the needed force to operate the driver blade and drive a nail. The configuration of the motor and clutch assemblies employed may vary as contemplated by one of ordinary skill in the art without departing from the scope and spirit of the present invention.

Figure 2:
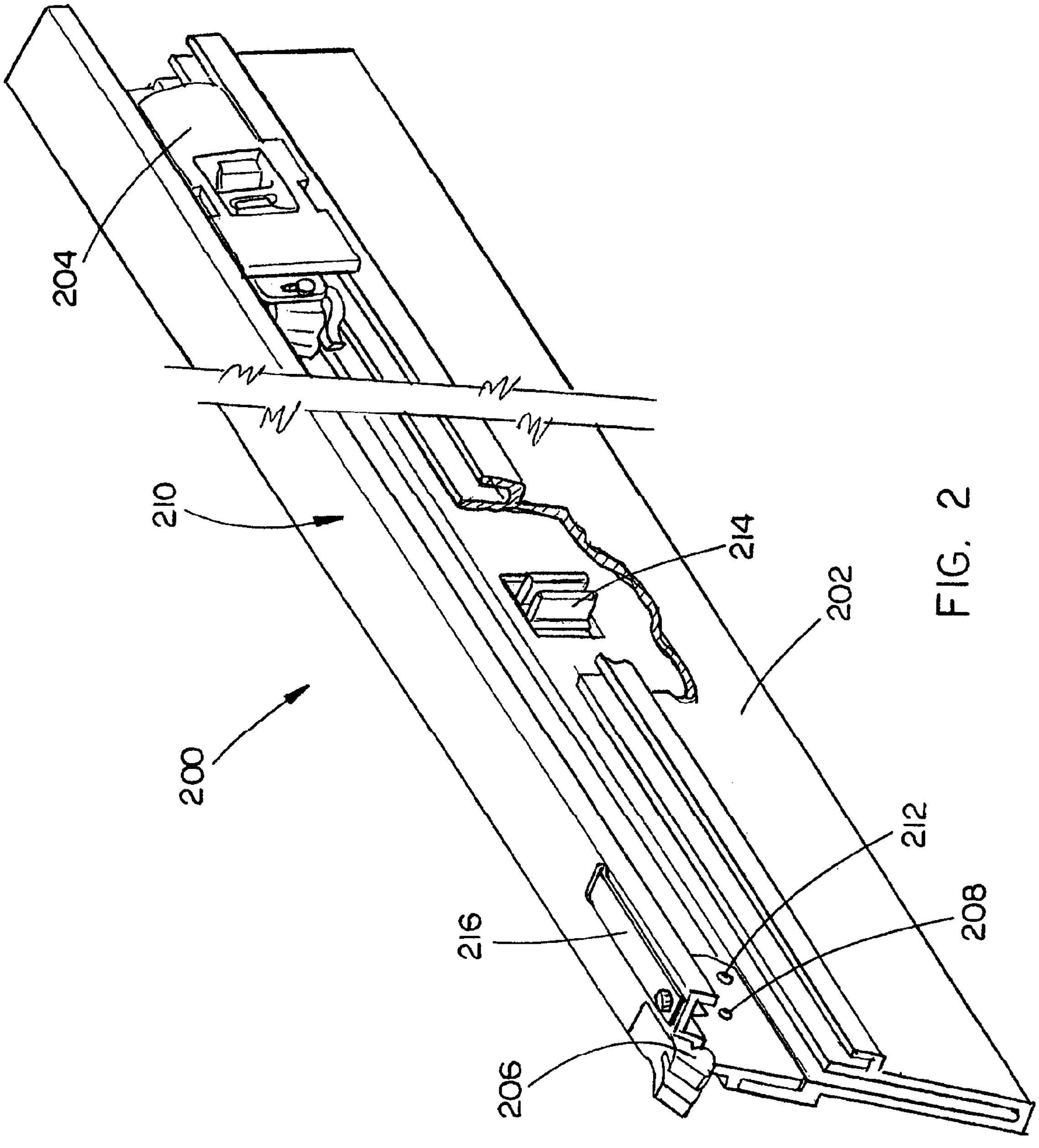
FIG. 2 is a cut-away view of the adjustable angle magazine including the nail spacing verification assembly and an articulating pusher assembly.

FIG. 2 illustrates an adjustable angle magazine 200 including a housing 202 arranged with a nail spacing verification assembly 214, an articulating pusher assembly 204, and a universal adapter assembly 206. A cover (not shown but similar to the cover 122 of FIG. 1) engages with the housing 202 and the adjustable angle magazine 200 provides the operator of a nail gun the ability to use different types of nails within the same nail gun as described previously.

The universal adapter assembly 206 may include a seating member and a rail member. The rail member may couple with the housing 202 through the use of a fastening device, such as a clip, screw, pin, and the like. The number and location through the rail member and housing 202 where the fasteners are employed may vary as contemplated by one of ordinary skill in the art. In the preferred embodiment, the universal adapter assembly 206 may be coupled with the housing 202 at the end of the housing 202 that engages with a nail gun. A first bolt engaged by a first nut through the fist fastening point 208 and a second bolt engaged by a second nut through the second fastening point 212 may secure the universal adapter assembly 206 to the housing 202. The first bolt may engage through the first fastening point 208 disposed on the universal adapter assembly. A first housing fastening point may align with the first fastening point 208 and allow the first bolt to pass through and be engaged by the first nut. The second bolt may pass through the second fastening point 212 and a second fastening point to engage with the second nut. It is understood that the fastening points located on both the universal adapter assembly 206 and the housing 202 may be located in various positions. Further, the method of fastening the universal adapter assembly 206 to the housing 202 may be varied. For example, the universal adapter assembly 206 may be locked in place through a compression lock assembly with a release button assembly to allow for removal from the housing 202. It is contemplated that the housing 202 may comprise a universal adapter assembly 206 which is integrated with the housing 202.

The seating member may be designed for engaging a cradle of the adjustable angle nose casting assembly 112. The seating member may comprise a first arm coupled with a second arm. The seating member may further comprise a notch that is coupled with the first and second arm. A transition plate may be coupled to the second arm of the seating member. The first and second arm may be configured with rounded heads for engagement with the cradle. This rounded head configuration enables rotational movement of the seating member once engaged with the cradle. The notch may be disposed across both the first and second arm and may be engaged by a fastening assembly to secure its position. Preferably, the notch may comprise a smooth surface to allow a cradle fastening assembly to slide upon it thereby enabling the rotational movement of the seating member.

A transition plate may provide a connection to the adjustable angle magazine 200. The transition plate may engage with the adjustable angle magazine 200 to securely affix the seating member. The transition plate may couple with the housing 202 through the use of a bolt and a nut. The bolt may engage the transition plate by first engaging a housing fastening point and next a transition plate fastening point. In the present embodiment, the housing fastening point and transition plate fastening point are apertures. The bolt may then engage the nut to fasten the housing 202 to the transition plate. It is also contemplated that a variety of fasteners may be used to couple the transition plate with the housing 102, such as clips, screws, pins, and the like. The rail member may provide further connection to the adjustable angle magazine 200. The rail member may also couple along a side of the adjustable angle magazine 200.

The articulating pusher assembly 204 is loaded into the housing 202 through the end opposite of the universal adapter assembly 206. The articulating pusher assembly 204 is enabled to slide up and down the length of the housing 202. This movement is enabled by a tension spool assembly 216. One end of the tension spool assembly 216 is affixed within the back end of the articulating pusher assembly 204 and the other end of the tension spool assembly 216 is affixed upon the housing 202 of the adjustable angle magazine 200.

It is contemplated that a support assembly comprising a first support member disposed on the housing and a second support member disposed on the cover may provide additional support for the adjustable angle magazine 200. The first and second support member may be configured to engage with a first support bar and a second support bar that protrude from the adjustable angle nose casting assembly. The engagement of the support bars and members may provide stability to the adjustable angle magazine 200, during operation. In the preferred embodiment, the first and second support members may comprise a section of the cover and housing, respectively, and include serrated or toothed sections. These serrated or toothed sections of the first and second support member may be designed to engage with complimentary serrated or toothed sections disposed upon the first and second support bar. Additionally, this combination may be designed to be releasably engaged, allowing for the easy adjustment of the angle of the housing relative to the adjustable angle nose casting assembly.

In the alternative the first and second support members may be coupled to the first and second support bars and include a mechanism for concomitant adjustment when the adjustment assembly is re-adjusted. For example, a worm drive assembly may be employed that allows for movement to adjust and then locks in place when the desired position has been reached. Alternatively, a compression lock assembly may be employed to accomplish the same re-positioning enabled by the adjustment assembly in combination with the nail gun fastening assembly discussed previously.

Further, the adjustable angle magazine of the present invention may be disposed with various other devices and mechanisms. These may include a pick-off pivot assembly, a nail shank pawl assembly, and the like. Additionally, the adjustable angle magazine may be enabled as a top-loading magazine, a side-loading magazine, and the like as may be contemplated by one of ordinary skill in the art.

Figure 3A:
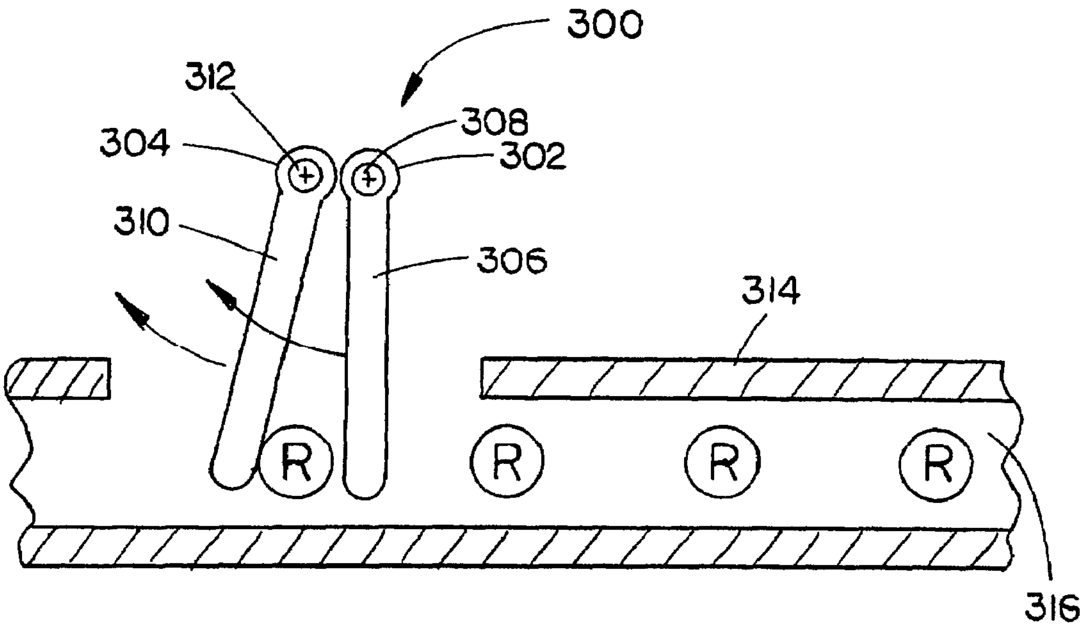
FIG. 3A is a top plan perspective view of the nail spacing verification assembly illustrating a first probe and a second probe operationally engaging with a nail within the adjustable angle magazine.
Figure 3B:
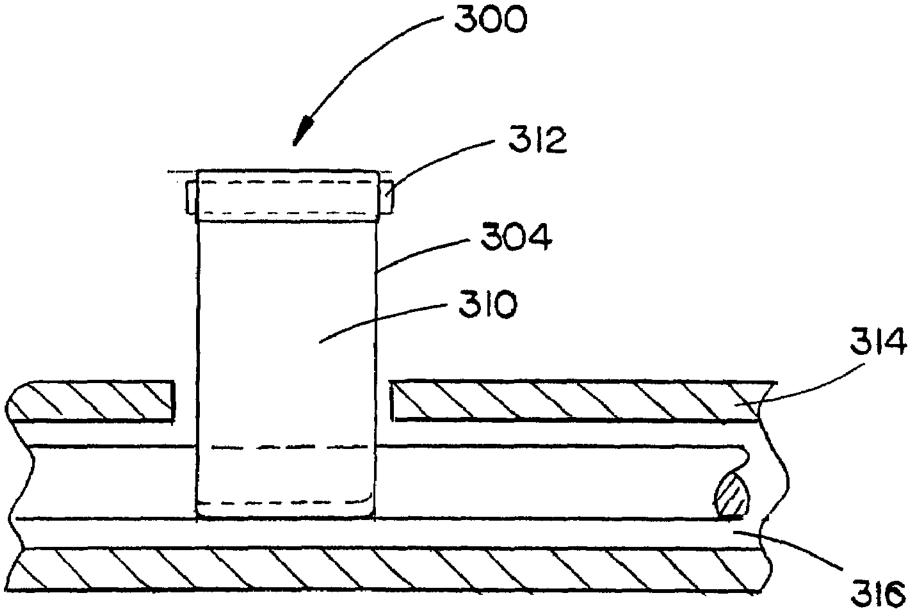
FIG. 3B is a side elevation view of the second probe engaging with the shank of the nail within the adjustable angle magazine and hindering the advancement of the nail.

In FIGS. 3A and 3B, a first nail spacing verification assembly 300, is shown. It is understood that the nail spacing verification assembly 126 and 214, shown in FIGS. 1 and 2, may be similar to the nail spacing verification assembly 300. The nail spacing verification assembly 300 includes a first probe 302 and a second probe 304. The first and second probe 302 and 304 are operationally coupled to each other and enabled to rotate. The first probe 302 includes a first armature 306 which is coupled with a first axle member 308. The first axle member 308 provides a tension to the first probe 302 allowing the probe 308 to rotate and then returning the probe 308 to a first position. The first axle member 308 couples with a housing 314 of an adjustable angle magazine. The first axle member 308 enables the rotational capabilities of the first probe 302. The second probe 304 includes a second armature 310 which is coupled with a second axle member 312. Similar to the first axle member 308, the second axle member 312 couples with the housing 314 of the adjustable angle magazine and enables the rotational capabilities of the second probe 304.

The first and second armature 306 and 310 operationally engage across a nail track 316 disposed within the housing 314 of the adjustable angle magazine. A collated nail strip 318 is loaded in the nail track 316. The collated nail strip 318 is a collated strip of round-head nails, being indicated in the current embodiment by a first, second, and third nail head each of which is denoted by the letter “R”. In operation, the nails advance down the nail track 316 and encounter the first armature 306 of the first probe 302, the first armature 306 is in a first position upon engagement with the nail and rotates to allow the shank of the nail to pass. In the present embodiment, the nail spacing verification assembly 300 is configured for the collated nail strip of round-head nails. In operation, as the nail shank engages with the first armature 306, the first armature 306 rotates out of the first position in a first clockwise direction to allow the nail shank to pass. If spacing between the shanks of the collated nails is present, as is typically the case with collated strips of round-head nails, then when the nail shank passes the first armature 306, the first armature 306 rotates in a second counter-clockwise direction back into the first position, in the spacing between the nails. Upon the counter-clockwise rotation back into the first position, in the spacing between the nails, the nail engages with the second armature 310, in a first position, of the second probe 302. The operational coupling of the first probe 302 and the second probe 304 enables the second probe 304 to rotate in a clockwise direction when engaged by the nail when the first probe 302 has returned to the first position after engaging the nail. The rotation of the second probe 304 allows the nail to pass. Thus, the type of nail has been verified as a round-head nail which is the correct type of nail for the adjustable angle magazine to load into the adjustable angle nose casting assembly for driving by the nail gun.

Alternatively, if no spacing exists between the nails, the first probe 302 is hindered from rotating in the counter-clockwise direction back into the first position. When the first probe 302 is unable to return to the first position the operational coupling with the second probe 304 hinders the second probe from rotating. Thus, the first and second probes are locked into place hindering the nail from further advancing down the nail track 316. In FIG. 3B, the second probe 304 has its second armature 310 engaged against the shank of the nail. In this exemplary embodiment, the second armature 310 is locked in place and is hindering the nail from advancing. This occurs in situations where the nail gun and the adjustable angle magazine are set up to employ round-head nails but instead clipped-head nails are loaded into the nail track 316. Alternatively, the second probe 304 may not be engaged by the first probe 302 if the angle of presentation of the adjustable angle magazine relative to the adjustable angle nose casting assembly is incorrect for the type of nails loaded into the adjustable angle magazine. Not shown in this embodiment, is the first probe 302 being locked in position, unable to rotate counter-clockwise back into the first position, because no spacing is available for the first probe 302 to rotate into.

Figure 4A:
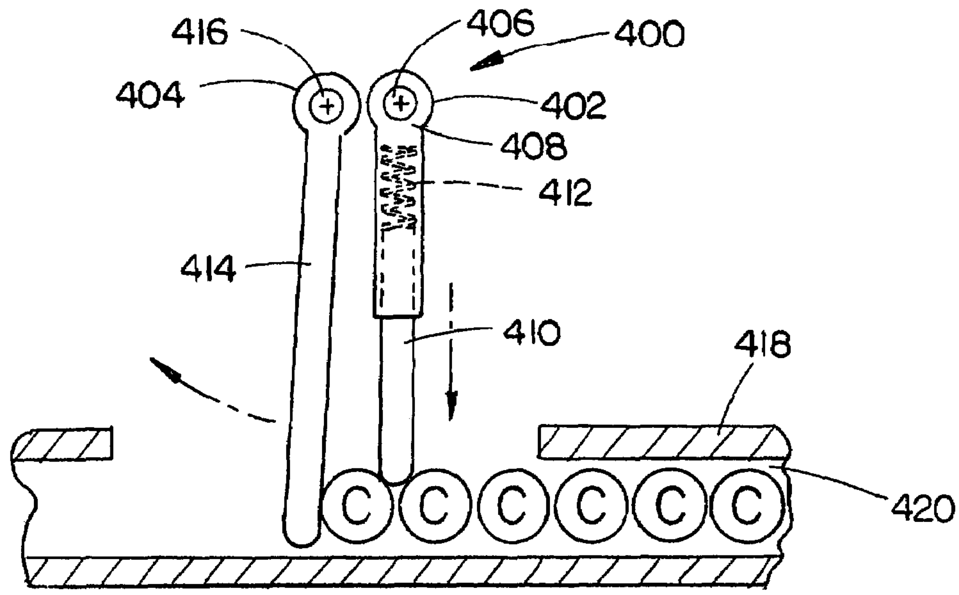
FIG. 4A is a top plan perspective view illustrating a second exemplary embodiment of a nail spacing verification assembly including a spring loaded first probe and a second probe operationally engaging a nail within an adjustable angle magazine.
Figure 4B:
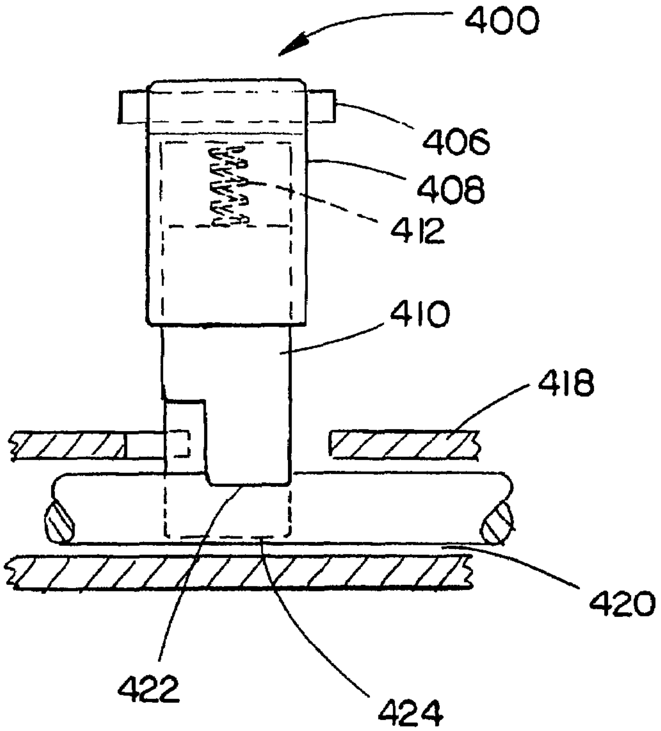
FIG. 4B is a side elevation view of the spring loaded first probe indicating the range of movement of the spring loaded first probe when engaging with the shank of the nail.

In FIGS. 4A and 4B, a second nail spacing verification assembly 400 is shown. In the current embodiment, the second nail spacing verification assembly 400 is employed for use with a nail gun using an adjustable angle magazine which is configured to load a collated nail strip of clipped-head nails into the nail gun. Preferably, as illustrated by FIG. 4A, the second spacing verification assembly 400 comprises a first spring loaded probe 402 and a second probe 404. The first spring loaded probe 402 comprises a sleeve 408 coupled with an armature 410. In the current embodiment, the armature 410 at least partially extends within the interior cavity of the sleeve 408. A spring assembly 412 is coupled on one end within the interior cavity of the sleeve 408 and couples on the other end with the armature 410. The spring assembly 412 enables the armature 410 to move up and down relative to the sleeve 408. It is understood that the spring assembly 412 may comprise a standard coil spring or alternate configurations as may be contemplated by one of ordinary skill in the art. The sleeve 408 is coupled via a first axle member 406 with a housing 418 of an adjustable angle magazine. The first axle member 406 provides a tension to the first spring loaded probe 402 allowing the probe 402 to rotate and then returning the probe 402 to its original position. Unlike, the first nail spacing verification assembly 300, shown in FIG. 3, the first axle member 406 does not utilize rotational enablement in order to regulate the passage of a collated nail strip, the collated nail strip being represented by the plurality of circles designated with a "C" in FIG. 4A. The second probe 404 includes a second armature 414 which is coupled with a second axle member 416. The second axle member 416 provides a tension to the probe 404 and couples with the housing 418 of the adjustable angle magazine. The second axle member 416 enables the rotational capabilities of the second probe 404.

The first spring loaded probe 402 and the second probe 404 are operationally coupled with one another. In operation, as a clipped-head nail advances down a nail track 420, the nail encounters the first spring loaded probe 402. The force applied by the shank of the nail as it contacts the armature 410 may cause some rotation of the first probe 402 but also causes the armature 410 to retract into the sleeve 408. The spring assembly 412 maintains a constant counter pressure against that supplied by the nail shank to the armature 410. Thus, as the shank passes under the armature 410, the force from the spring assembly 412 pushes the armature 410 down. If no spacing exists between the nails, the armature 410 of the first spring loaded probe 402 is hindered from extending. As a result, the second probe 404 is engaged and as the nail shank contacts the armature 414, the armature 414 rotates clockwise, allowing the nail to pass. If, however, spacing exists between the nails, the armature 410 extends into the space. When this occurs the first spring loaded probe 402 locks in its position and the second probe 404 is not engaged and therefore the second probe 404 is locked in position, thereby hindering the nail from passing.

In FIG. 4B, the first spring loaded probe 402 is illustrated and the movement capabilities of the armature 410 relative to the sleeve 408 are shown. It is understood that the first and second probe 402 and 404 substantially extend across the nail track 420 to engaged with the nails loaded into the housing 418 of the adjustable angle magazine. When the armature 410 is in its extended position 424, as enabled by the spring assembly 412, the first spring loaded probe 402 locks in position and the armature 410 contacts the shank of the nail, hindering passage of the nail and advancement down the nail loading assembly. When the armature 410 is in the retracted position 422 the probe 402 is enabled to allow the clipped-head nails to pass under the probe and proceed to advance down the nail track 420.

It is contemplated that the configuration of the first and second probes of the first and second nail spacing verification assembly 300 and 400 may vary. For example, the length of the probes may be altered to accommodate a variety of nail loading assemblies. Further, the spacing between the probes may be altered and the location within the housing of the nail loading assembly may be varied. The coupling of the probes with the housing may enable more or less movement capabilities than those specifically identified without departing from the scope and spirit of the present invention.

Figure 5:
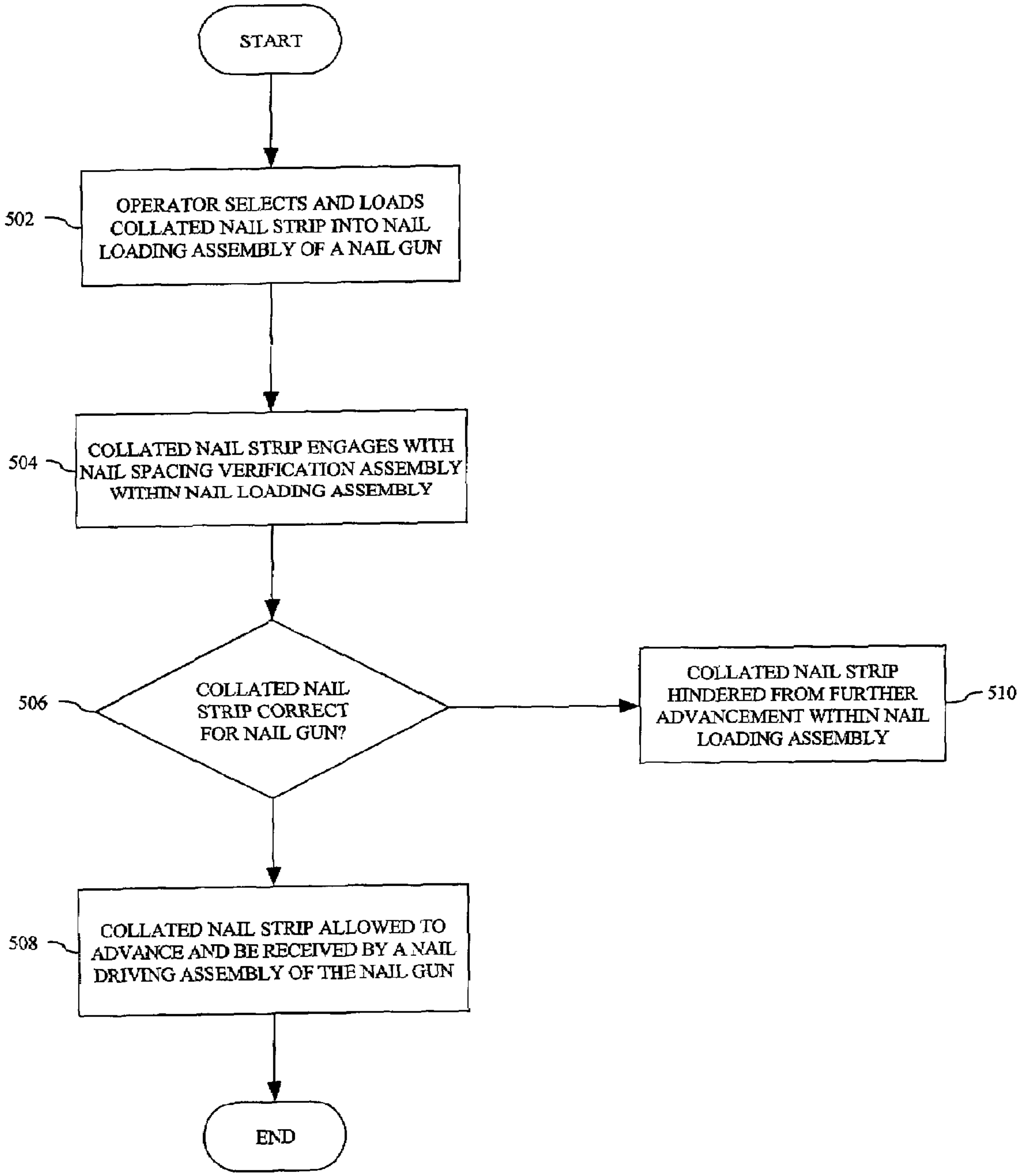
FIG. 5 is a flowchart illustrating a method for using a nail gun by determining whether a collated nail strip is correct for the nail gun.

A method for determining whether a proper collated nail strip is being advanced to a nail driving assembly from a nail loading assembly of a nail gun, is shown in FIG. 5. In a first step 502, the operator of the nail gun initially loads a collated nail strip into the nail loading assembly. It is understood that the collated nail strip may be loaded into a nail loading assembly with various loading configurations, such as rear-loading, top-loading, side-loading, and the like. The nails of the collated nail strip, in step 504, engage with a nail spacing verification assembly disposed within the nail loading assembly. In step 506 the nail spacing verification assembly determines if the collated nail strip, which is being advanced through the nail loading assembly to the nail driving assembly for operation upon by the nail driving assembly, is providing the nails in the correct position for the nail gun. If it is determined that the nails being provided are in the correct position for operation upon by the nail driving assembly, then in step 508 the nail spacing verification assembly allows the collated nail strip to advance. The advancing collated nail strip has the nails received by the nail driving assembly where the nails may be driven. If, however, it is determined that the nails being provided are incorrectly positioned for operation upon by the nail driving assembly, then in step 510 the nail spacing verification assembly hinders the collated nail strip from advancing by engaging with the nails and locking in position, thereby locking the nail strip in place within the nail gun. When the nail spacing verification assembly locks in position and hinders further advancement of the collated nail strip, the operator of the nail gun is provided an indication that the collated nail strip the operator selected is incorrect for use with the nail gun.

It is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the present invention and many of its attendant advantages may be understood by the forgoing description. It is also believed that it may be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A nail spacing verification assembly, for use in a nail loading assembly coupled to a nail gun, comprising: a first probe coupled with the nail loading assembly, the first probe for engaging nails in a collated nail strip and determining the spacing of the nails in the collated nail strip; and a second probe coupled with the nail loading assembly and operationally coupled with the first probe, the second probe for engaging with the nails after they have passed the first probe, wherein the second probe in operational concert with the first probe allows the nail to advance when the spacing of the nails in the collated nail strip is determined to be correct for use by the nail gun.

2. The nail spacing verification assembly of claim 1, wherein the first probe further comprises a first armature coupled with a first axle, wherein the axle enables rotational movement of the first armature and couples the first armature with the nail loading assembly.

3. The nail spacing verification assembly of claim 1, wherein the second probe further comprises a second armature coupled with a second axle, wherein the axle enables rotational movement of the second armature and couples the second armature with the nail loading assembly.

4. The nail spacing verification assembly of claim 1, wherein the nail loading assembly is an adjustable angle magazine.

5. The nail spacing verification assembly of claim 4, wherein the adjustable angle magazine further comprises a universal adapter assembly.

6. The nail spacing verification assembly of claim 4, wherein the adjustable angle magazine further comprises a pick-off pivot assembly.

7. The nail spacing verification assembly of claim 4, wherein the adjustable angle magazine further comprises an articulating pusher assembly.

8. The nail spacing verification assembly of claim 4, wherein the adjustable angle magazine further comprises a nail shank pawl assembly.

9. The nail spacing verification assembly of claim 4, wherein the adjustable angle magazine is a top-load magazine or side-load magazine.

10. The nail spacing verification assembly of claim 1, wherein the nail gun is selected from the group consisting of a spring-loaded nail gun, a pneumatic nail gun, an electromagnetic nail gun, a combustion nail gun, and a motor driven nail gun.

11. The nail spacing verification assembly of claim 1, wherein the nail gun further comprises a clutch assembly.

12. A nail spacing verification assembly, for use in a nail loading assembly coupled to a nail gun, comprising:

a first spring loaded probe coupled with the nail loading assembly, the first spring loaded probe for engaging nails in a collated nail strip and determining the spacing of the nails in the collated nail strip; and a second probe coupled with the nail loading assembly and operationally coupled with the first spring loaded probe, the second probe for engaging with the nails after they have passed the first spring loaded probe, wherein the second probe in operational concert with the first spring loaded probe allows the nails to advance when the spacing of the nails in the collated nail strip is determined to be correct for use by the nail gun.

13. The nail spacing verification assembly of claim 12, wherein the first probe further comprises a first sleeve coupled with a first axle, the first sleeve is further coupled with a spring assembly which couples with a first armature, wherein the axle enables rotational movement of the first sleeve and first armature and couples the first sleeve with the nail loading assembly.

14. The nail spacing verification assembly of claim 12, wherein the second probe further comprises a second armature coupled with a second axle, wherein the axle enables rotational movement of the second armature and couples the second armature with the nail loading assembly.

15. The nail spacing verification assembly of claim 12, wherein the nail loading assembly is an adjustable angle magazine.

16. The nail spacing verification assembly of claim 15, wherein the adjustable angle magazine further comprises a universal adapter assembly.

17. The nail spacing verification assembly of claim 15, wherein the adjustable angle magazine further comprises a pick-off pivot assembly.

18. The nail spacing verification assembly of claim 15, wherein the adjustable angle magazine further comprises an articulating pusher assembly.

19. The nail spacing verification assembly of claim 15, wherein the adjustable angle magazine further comprises a nail shank pawl assembly.

20. The nail spacing verification assembly of claim 15, wherein the adjustable angle magazine is a top-load magazine or side-load magazine.

21. The nail spacing verification assembly of claim 12, wherein the nail gun is selected from the group consisting of a spring-loaded nail gun, a pneumatic nail gun, an electromagnetic nail gun, a combustion nail gun, and a motor driven nail gun.

22. The nail spacing verification assembly of claim 12, wherein the nail gun further comprises a clutch assembly.

23. An adjustable angle magazine for use with a nail gun, comprising:

a housing including a first end and a second end, the housing for storing and providing nails in a collated nail strip to a nail driving assembly of the nail gun;

an adjustment assembly disposed proximal to the second end of the housing, the adjustment assembly for affixing the position of the housing relative to the nail gun;

a universal adapter assembly coupled with the first end of the housing, the universal adapter assembly for pivotally coupling with the nail driving assembly; and a nail spacing verification assembly disposed upon the housing, the nail spacing verification assembly for engaging the nails in the housing, wherein the nail spacing verification assembly allows the nails to advance when the spacing of the nails in the collated nail strip is determined to be correct for use by the nail gun.

24. The adjustable angle magazine of claim 23, wherein the nail spacing verification assembly is a first nail spacing verification assembly comprising:

a first probe coupled with the housing, the first probe for engaging nails in a collated nail strip and determining the spacing of the nails in the collated nail strip; and a second probe coupled with the housing and operationally coupled with the first probe, the second probe for engaging with the nails after they have passed the first probe, wherein the second probe in operational concert with the first probe allows the nail to advance when the spacing of the nails in the collated nail strip is determined to be correct for use by the nail gun.

25. The adjustable angle magazine of claim 23, wherein the nail spacing verification assembly is a second nail spacing verification assembly comprising:

a first spring loaded probe coupled with the housing, the first spring loaded probe for engaging nails in a collated nail strip and determining the spacing of the nails in the collated nail strip; and a second probe coupled with the housing and operationally coupled with the first spring loaded probe, the second probe for engaging with the nails after they have passed the first spring loaded probe, wherein the second probe in operational concert with the first spring loaded probe allows the nails to advance when the spacing of the nails in the collated nail strip is determined to be correct for use by the nail gun.

26. The adjustable angle magazine of claim 23, further comprising an articulating pusher assembly.

27. The adjustable angle magazine of claim 23, further comprising a nail shank pawl assembly.

28. The adjustable angle magazine of claim 23, wherein the adjustable angle magazine is a top-load magazine or side-load magazine.

29. The adjustable angle magazine of claim 23, wherein the nail gun is selected from the group consisting of a spring-loaded nail gun, a pneumatic nail gun, an electromagnetic nail gun, a combustion nail gun, and a motor driven nail gun.

30. The adjustable angle magazine of claim 23, wherein the nail gun is selected from the group consisting of a spring-loaded nail gun, a pneumatic nail gun, an electromagnetic nail gun, a combustion nail gun, and a motor driven nail gun.

31. The adjustable angle magazine of claim 23, wherein the nail gun further comprises a clutch assembly.

32. An adjustable angle nail gun, comprising:

a handle including a first end and a second end, the second end coupled with a fastening assembly;

a nail driving assembly coupled with the first end of the handle, the nail driving assembly including a driver blade, the nail driving assembly for driving nails in a collated nail strip;

an adjustable angle nose casting assembly coupled with the nail driving assembly, the adjustable angle nose casting assembly for receiving the nail and enabling the operational engagement of the driver blade with the nail;

an adjustable angle magazine including a first end coupled with a universal adapter assembly for pivotally coupling with the adjustable angle nose casting assembly and an adjustment assembly disposed proximal to a second end of the adjustable angle magazine, the adjustment assembly for coupling with the fastening assembly, the adjustable angle magazine for storing and providing the nails to the adjustable angle nose casting assembly, a nail spacing verification assembly disposed upon the housing, the nail spacing verification assembly for engaging the nails in the housing, wherein the nail spacing verification assembly allows the nails to advance when the spacing of the nails in the collated nail strip is determined to be correct for use by the nail gun.

33. The adjustable angle nail gun of claim 32, wherein the nail spacing verification assembly is a second nail spacing verification assembly comprising:

a first probe coupled with the adjustable angle magazine, the first probe for engaging nails in a collated nail strip and determining the spacing of the nails in the collated nail strip; and a second probe coupled with the adjustable angle magazine and operationally coupled with the first spring loaded probe, the second probe for engaging with the nails after they have passed the first probe, wherein the second probe in operational concert with the first probe allows the nails to advance when the spacing of the nails in the collated nail strip is determined to be correct for use by the nail gun.

34. The adjustable angle nail gun of claim 32, wherein the nail spacing verification assembly is a second nail spacing verification assembly comprising:

a first spring loaded probe coupled with the adjustable angle magazine, the first spring loaded probe for engaging nails in a collated nail strip and determining the spacing of the nails in the collated nail strip; and a second probe coupled with the adjustable angle magazine and operationally coupled with the first spring loaded probe, the second probe for engaging with the nails after they have passed the first spring loaded probe, wherein the second probe in operational concert with the first spring loaded probe allows the nails to advance when the spacing of the nails in the collated nail strip is determined to be correct for use by the nail gun.

35. The adjustable angle nail gun of claim 32, wherein the adjustable angle magazine further comprises a pick-off pivot assembly.

36. The adjustable angle nail gun of claim 32, wherein the adjustable angle magazine further comprises an articulating pusher assembly.

37. The adjustable angle nail gun of claim 32, wherein the adjustable angle magazine further comprises a nail shank pawl assembly.

38. The adjustable angle nail gun of claim 32, wherein the adjustable angle magazine is a top-load magazine or side-load magazine.

39. The adjustable angle nail gun of claim 32, wherein the adjustable angle nail gun is selected from the group consisting of a spring-loaded nail gun, a pneumatic nail gun, an electro-magnetic nail gun, a combustion nail gun, and a motor driven nail gun.

40. The adjustable angle nail gun of claim 32, wherein the adjustable angle nail gun further comprises a clutch assembly.

41. A nail spacing verification assembly for use with a nail loading assembly of a nail gun, comprising:

means for determining the spacing between nails of a collated nail strip in the nail loading assembly and allowing the nails to advance when the spacing of the nails in the collated nail strip is determined to be correct for use by the nail gun.

42. The nail spacing verification assembly of claim 41, wherein the means for determining spacing and allowing advancement is a nail spacing verification assembly disposed upon the nail loading assembly.

43. The nail spacing verification assembly of claim 41, wherein the nail loading assembly is an adjustable angle magazine.

44. The nail spacing verification assembly of claim 43, wherein the adjustable angle magazine further comprises a universal adapter assembly.

45. The nail spacing verification assembly of claim 43, wherein the adjustable angle magazine further comprises a pick-off pivot assembly.

46. The nail spacing verification assembly of claim 43, wherein the adjustable angle magazine further comprises an articulating pusher assembly.

47. The nail spacing verification assembly of claim 43, wherein the adjustable angle magazine further comprises a nail shank pawl assembly.

48. The nail spacing verification assembly of claim 43, wherein the adjustable angle magazine is a top-load magazine or side-load magazine.

49. The nail spacing verification assembly of claim 41, wherein the nail gun is selected from the group consisting of a spring-loaded nail gun, a pneumatic nail gun, an electro-magnetic nail gun, a combustion nail gun, and a motor driven nail gun.

50. The nail spacing verification assembly of claim 41, wherein the nail gun further comprises a clutch assembly.

51. A spacing verifier for use in a fastening power tool, the spacing verifier comprising:

a first member coupled to the fastening power tool, the first member configured to determine spacing between at least two fasteners in a strip; and a second member coupled to the fastening power tool, the second member operationally coupled to the first member for engaging one fastener of the at least two fasteners after the one fastener has passed the first member, wherein the second member is configured to prevent advancement of the one fastener when the spacing between the at least two fasteners is determined to be less than a predetermined value.

52. The spacing verifier of claim 51 wherein the first member comprises a probe.

53. The spacing verifier of claim 52 wherein the probe comprises an armature coupled to an axle of the fastening power tool.

54. The spacing verifier of claim 53 wherein the probe comprises a spring-biased member coupled to the armature.

55. The spacing verifier of claim 51 wherein the second member comprises a probe.

56. The spacing verifier of claim 55 wherein the probe comprises an armature coupled to an axle of the fastening power tool.

* * * * *